United States Patent Office 2,708,206
Patented May 10, 1955

2,708,206
DIAMMONIUM COMPOUNDS

Emil Girod, Riehen, near Basel, and Franz Häfliger, Basel, Switzerland, assignors to J. R. Geigy A. G., Basel, Switzerland No Drawing. Application April 20, 1953,
Serial No. 349,947

Claims priority, application Switzerland April 22, 1952

3 Claims. (Cl. 260—482)

This invention concerns new diammonium compounds of the general formula:

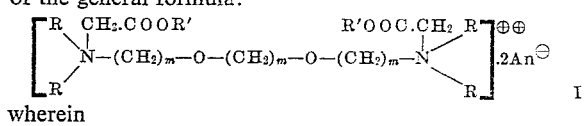

wherein

represents low molecular dialkylamino groups, piperidino, methylpiperidino, pyrrolidino, methylpyrrolidino, morpholino or methyl-morpholino groups, R' represents low molecular alkyl radicals,
$n$ represents a whole number from 8 to 20,
$m$ represents a whole number from 2 to 4, and
$An^\ominus$ represents a monovalent anion, in particular of halogen hydrohalic acids or a normal equivalent of a polyvalent anion.

Such compounds can be produced by reacting bis-aminoalkoxyalkanes of the general formula:

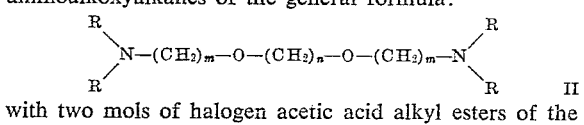

with two mols of halogen acetic acid alkyl esters of the general formula:

$$\text{Hal—CH}_2\text{—COO—R'} \qquad \text{III}$$

wherein

R', $m$ and $n$ have the meanings given above and Hal represents a halogen atom.

The ditertiary bis-aminoalkoxy-alkanes of the general Formula II necessary as starting materials can be obtained for example by reacting $\alpha,\omega$-alkane diols of the general formula $$\text{HO—(CH}_2)_n\text{—OH}$$

preferably in the form of their metal compounds (alcoholates) with 2 mols of tertiary aminoalkyl halides of the general formula

or by reacting $\alpha,\omega$-dihalogen alkanes of the general formula $$\text{Hal—(CH}_2)_n\text{—Hal}$$

with 2 mols of tertiary aminoalcohols of the general formula

also advantageously in the form of their metal compounds. The second process is to be preferred when the corresponding tertiary aminoalkyl halides, which are necessary in the first process are very unstable, such as e. g. for the production of ditertiary bis-($\delta$-aminobutoxy)-alkanes.

The following can be named for example as ditertiary bis-aminoalkoxy-alkanes of the general Formula II:

1,8 - bis - ($\beta$ - dimethylamino-ethoxy)octane B. P.$_{0.05}$ 142–144°
1,8-bis-($\beta$-diethylamino-ethoxy)-octane B. P.$_{0.08}$ 156–158°
1,8-bis-($\gamma$-diethylamino-propoxy)-octane B. P.$_{0.05}$ 163–165°
1,9 - bis - ($\beta$ - dimethylamino - ethoxy)-nonane B. P.$_{0.06}$ 148–150°
1,9 - bis - ($\beta$ - diethylamino - ethoxy)-nonane, B. P.$_{0.06}$ 154–159°
1,10 - bis - ($\beta$ - dimethylamino - ethoxy)-decane, B. P.$_{0.04}$ 134–137°
1,10 - bis - ($\beta$ - diethylamino - ethoxy)-decane B. P.$_{0.035}$ 153–157°
1,10-bis-($\beta$-pyrrolidino - ethoxy)-decane, dihydrobromide M. P. 154°
1,10-bis-($\beta$-piperidino-ethoxy)-decane, B. P.$_{0.04}$ 159–168°
1,10-bis-($\beta$-morpholino-ethoxy)-decane B. P.$_{0.15}$ 211–215°
1-($\beta$-dimethylamino-ethoxy) - 10 - ($\gamma$-diethylamino-propoxy)-decane B. P.$_{0.07}$ 153–158°
1-($\beta$-diethylamino-ethoxy) - 10 - $\gamma$ - (dimethylaminopropoxy)-decane, B. P.$_{0.03}$ 144–149°
1,10-bis-($\gamma$ - dimethylamino - propoxy)-decane, B. P.$_{0.02}$ 140–144°
1,10 - bis - ($\gamma$ - diethylaminopropoxy) - decane, B. P.$_{0.03}$ 164–169°
1,10 - bis - ($\gamma$ - dibutylamino-propoxy)-decane, B. P.$_{0.09}$ 230–231°
1,11 - bis - ($\beta$-dimethylamino-ethoxy)-undecane, B. P.$_{0.18}$ ca. 152°
1,12-bis-($\gamma$-diethylamino-propoxy)-dodecane
1,14-bis-($\beta$-diethylamino-ethoxy)-tetradecane, B. P.$_{0.001}$ approx. 170°
1,15-bis-($\delta$-dimethylamino-butoxy)-pentadecane
1,16-bis-($\beta$-dimethylamino-ethoxy)-hexadecane
1,16-bis-($\gamma$-dimethylamino-propoxy)-hexadecane
1,18-bis-($\beta$-diethylamino-ethoxy)-octadecane
1,20-bis-($\beta$-dimethylamino-ethoxy)-eicosane The following can be used for example as halogen acetic acid esters of the general formula $$\text{Hal—CH}_2\text{—CO—OR'}$$

wherein R' represents a low molecular alkyl radical, chloracetic acid and bromacetic acid methyl esters, -ethyl esters, -n-propyl-esters, -isopropyl esters, -n-butyl esters, -isobutyl esters, -sec. butyl esters, -n-amyl esters and -isoamyl esters and the hexyl esters.

As the pharmacological activity of the salts according to this invention depends chiefly on the cation, the type of anion is of lesser importance for the purpose of this invention. Only salts of such inorganic or organic acids should be used for therapeutical purposes which are not in themselves strongly toxic and so do not cause pharmacological side effects. In other respects, the choice of the anion depends on various other factors such as cost of acid or of quaternating agent, facility of reaction, capability to form crystals (possibility of purifying) and water solubility of the products. The most suitable acid is easy to find from case to case by a few tests.

Compounds in which $An^\ominus$ is different from $Hal^\ominus$, $(\text{—O—SO}_2\text{—O—R})^\ominus$ or $(\text{Aryl-SO}_2\text{—O})^\ominus$ are produced advantageously by later exchange of these for other anions.

The diquaternary salts are almost colourless compounds which crystallise or sometimes they are in the form of yellow viscous oils. Particularly organic solvents or suitable mixtures thereof such as mixtures of those which generally dissolve well like alcohols with those which do not dissolve so well such as acetone or ethyl acetate or those which only dissolve slightly such as ether or benzene are suitable for the formation of crystals. In general, these salts dissolve well in water with a practically neutral reaction.

The diammonium compounds produced according to the present invention can be used for pharmaceutical purposes. In particular they influence the muscle tonus. They have an action similar to curare, some have a spasmolytic action also.

The following examples illustrate the invention further. Parts are given as parts by weight, preferably in grammes. The relationship of parts by weight to parts by volume is as that of grammes to cubic centimetres. The temperatures are in degrees centigrade.

EXAMPLE 1

*1,10 - bis - [β - (dimethyl - carbalkoxymethyl - ammonium)-ethoxy]-decane dibromides*

1 mol of 1,10-bis-(β-dimethylaminoethoxy)-decane, 30 mols of dry acetone and about 2.4 mols of bromacetic acid-alkyl ester (for particulars of amounts see table) are boiled for about 14 hours under reflux. After cooling, should the quaternary salts precipitate in an oily form, they are crystallised by first cooling and rubbing, then filtered off under suction and if desired recrystallised from hot butanone with the addition of the alkanol corresponding to the alkyl radical in the bromacetic acid alkyl ester and dried in the vacuum at 50–60°.

| Alkyl radical | M. P., degrees | Produced from 3.16 parts of decane derivative in 20 parts by volume of acetone and— |
|---|---|---|
| Ethyl | 137 | 4 parts of bromacetic acid ethyl ester. |
| Isopropyl | 144 | 4.3 parts of bromacetic acid isopropyl ester. |
| n-Propyl | 79 | 4.3 parts of bromacetic acid propyl ester. |
| n-Butyl | 97 | 4.7 parts of bromacetic acid butyl ester. |
| iso-Butyl | 127–128 | 4.6 parts of bromacetic acid isobutyl ester. |
| tert. Butyl | 110 | 4.6 parts of bromacetic acid tert. butyl ester. |
| n-Hexyl | 134–137 | 4.9 parts of bromacetic acid hexyl ester. |

EXAMPLE 2

*1,10 - bis - [β - (diethyl - carbethoxymethyl - ammonium)-ethoxy]-decane dibromide*

7.44 parts of bis-β-(diethylamino-ethoxy)-decane, 40 parts by volume of dry ethyl acetate and 8 parts of bromacetic acid ethyl ester are boiled under reflux for about 14 hours. The acetic ester is poured off from the precipitated quaternary salt, the latter is stirred with dry acetone and abs. methanol is added until a solution is formed. On standing at —5°, the salt crystallises into big clear crystals. The crystals are filtered off under suction, washed with acetone and abs. ether and dried at 40–50° in a high vacuum. The hygroscopic product melts at about 75°.

The following can be produced for example in an analogous manner:

1,8 - bis - [β - (carbethoxymethyl - dimethyl - ammonium)-ethoxy]-octane dibromide 1,8 - bis - [β - (carbomethoxymethyl - diethyl - ammonium)-ethoxy]-octane dibromide 1,8 - bis - [γ - (carbomethoxymethyl - diethyl - ammonium)-propoxy]-octane dibromide 1,9 - bis - [β - (carbomethoxymethyl - dimethyl - ammonium)-ethoxy]-nonane dibromide 1,9 - bis - [β - (carbobutoxymethyl - diethyl - ammonium)-ethoxy]-nonane dibromide 1,10 - bis - [β - carbethoxymethyl - dimethyl - ammonium)-ethoxy]-decane dichloride 1,10 - bis - [β - (carbethoxymethyl - methyl - ethyl - ammonium)-ethoxy]-decane dibromide 1,10 - bis - [β - (carbethoxymethyl - pyrrolidinium)-ethoxy]-decane dibromide, M. P. 140°

1,10 - bis - [β - carbomethoxymethyl - 2′,5′ - dimethyl-pyrrolidinium)-ethoxy]-decane dibromide 1,10 - bis - [β - (carbopropoxymethyl - piperidinium)-ethoxy]-decane dibromide 1,10 - bis - [β - (carbohexyloxymethyl - morpholinium)-ethoxy]-decane dibromide 1,10 - bis - [β - (carbomethoxymethyl - 3′,5′ - dimethylmorpholinium)-ethoxy]-decane dibromide 1,10 - bis - [ γ- (carbethoxymethyl - dimethyl - ammonium)-propoxy]-decane dibromide 1,10 - bis - [γ - (carbomethoxymethyl - diethyl - ammonium)-propoxy]-decane dibromide 1,10 - bis - [β - (carbomethoxymethyl - diethyl - ammonium)-ethoxy]-decane dichloride 1,10 - bis - [γ - (carbomethoxymethyl - dibutyl - ammonium)-propoxy]-decane dibromide 1,10 - bis - [γ - (carbopropoxymethyl - pyrrolidinium)-propoxy]-decane dibromide 1,10 - bis - [δ - (carbomethoxymethyl - diethyl - ammonium)-butoxy]-decane dibromide 1,11 - bis - [β - (carboethoxymethyl - dimethylammonium)-ethoxy]-undecane dibromide 1,11 - bis - [β - carboethoxymethyl - diethyl - ammonium)-ethoxy]-undecane dibromide 1,12 - bis - [β - (carbomethoxymethyl - dimethyl - ammonium)-ethoxy-dodecane dibromide 1,12 - bis - [β - (carbohexyloxymethyl - dimethyl - pyrrolidinium)-ethoxy]-dodecane dibromide 1,12 - bis - [γ - (carbomethoxymethyl - diethyl - ammonium)-propoxy]-dodecane dibromide 1,13 - bis - [β - (carbethoxymethyl - dimethyl - ammonium)-ethoxy]-tridecane dibromide 1,14 - bis - [β - (carbomethoxymethyl - diethyl - ammonium)-ethoxy]-tetradecane dibromide 1,15 - bis - [δ - (carbobutoxymethyl - dimethyl - ammonium)-butoxy]-pentadecane dibromide 1,16 - bis - [β - (carbomethoxymethyl - dimethyl - ammonium)-ethoxy]-hexadecane dibromide 1,16 - bis - [β - (carboisoamyloxymethyl - dimethyl - ammonium)-ethoxy]-hexadecane dibromide 1,16 - bis - [β - (carbohexyloxymethyl - piperidinium)-ethoxy]-hexadecane dibromide 1,16 - bis - [β - (carboisopropoxymethyl - dimethylammonium)-ethoxy]-hexadecane dibromide 1,18 - bis - [β - (carbomethoxymethyl - diethyl - ammonium)-ethoxy]-octadecane dibromide 1,20 - bis - [β - (carboethoxymethyl - dimethyl - ammonium)-ethoxy]-eicosane dibromide

What we claim is:

1. A diammonium compound of the formula $$\left[ \begin{array}{c} R \\ | \\ N \\ | \\ R \end{array} \begin{array}{c} CH_2COO-R' \\ | \\ -(CH_2)_m-O-(CH_2)_n-O-(CH_2)_m-N \\ \end{array} \begin{array}{c} R'-OOC.CH_2 \ R \\ | \\ \\ | \\ R \end{array} \right]^{\oplus\oplus} \cdot 2An^{\ominus}$$

wherein $$\begin{array}{c} R \\ N \\ \backslash \\ R \end{array}$$

represents a member selected from the group consisting of low molecular dialkylamino radicals, a piperidino radical, a methylpiperidino radical, a pyrrolidino radical, a methylpyrrolidino radical, a morpholino radical and a methylmorpholino radical R′ represents a low molecular alkyl radical

*m* represents an integer from 2 to 4

*n* represents an integer from 8 to 20, and

An⊖ represents a monovalent anion.

2. 1,10 - bis - [β - (dimethyl - carbethoxymethyl-ammonium)-ethoxy]-decane dibromide.

3. 1,10 - bis - [β - (dimethyl - cartobutoxymethyl-ammonium)-ethoxy]-decane dibromide.

References Cited in the file of this patent

UNITED STATES PATENTS

| 2,101,524 | Balle et al. | Dec. 7, 1937 |
| 2,667,493 | Slack | Jan. 26, 1954 |
| 2,668,855 | Goldberg et al. | Feb. 9, 1954 |